United States Patent
Suginobu et al.

(10) Patent No.: US 10,339,968 B2
(45) Date of Patent: Jul. 2, 2019

(54) BASE UNIT, SPINDLE MOTOR, AND DISK DRIVE APPARATUS

(71) Applicant: Nidec Corporation, Kyoto (JP)

(72) Inventors: Shingo Suginobu, Kyoto (JP); Takumi Shimomura, Kyoto (JP); Masahiro Imahori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/028,458

(22) Filed: Jul. 6, 2018

(65) Prior Publication Data

US 2019/0080715 A1 Mar. 14, 2019

(30) Foreign Application Priority Data

Sep. 8, 2017 (JP) ................................ 2017-173272
May 22, 2018 (JP) ................................ 2018-097627

(51) Int. Cl.
| | |
|---|---|
| G11B 33/12 | (2006.01) |
| G11B 19/20 | (2006.01) |
| H02K 5/16 | (2006.01) |
| H02K 5/22 | (2006.01) |
| G11B 33/14 | (2006.01) |
| H02K 21/22 | (2006.01) |

(52) U.S. Cl.
CPC ........ *G11B 19/2036* (2013.01); *G11B 33/122* (2013.01); *G11B 33/123* (2013.01); *G11B 33/1466* (2013.01); *H02K 5/16* (2013.01); *H02K 5/163* (2013.01); *H02K 5/225* (2013.01); *H02K 21/22* (2013.01)

(58) Field of Classification Search
None
See application file for complete search history.

(56) References Cited

U.S. PATENT DOCUMENTS

| | | | |
|---|---|---|---|
| 2008/0206928 A1 | 8/2008 | Onishi et al. | |
| 2012/0325539 A1* | 12/2012 | Yoon ................... | B23K 35/262 174/261 |
| 2013/0271871 A1* | 10/2013 | Watanabe ................ | G06F 1/16 360/99.08 |

FOREIGN PATENT DOCUMENTS

JP 8-31848 A 2/1996

* cited by examiner

*Primary Examiner* — William J Klimowicz
(74) *Attorney, Agent, or Firm* — Keating & Bennett, LLP

(57) ABSTRACT

Provided is a base unit for use in a disk drive apparatus including a motor arranged to be capable of rotating about a central axis extending in a vertical direction. The base unit includes a base member arranged to extend radially to support the motor, and including a predetermined adhesion region and an outside region outside of the adhesion region; and a connector electrically connected to a wire arranged on the base member. The connector is adhered to the base member through an adhesive at the adhesion region of the base member. A wettability of the adhesive on the adhesion region is higher than a wettability of the adhesive on the outside region of the base member.

8 Claims, 5 Drawing Sheets

BASE UNIT, SPINDLE MOTOR, AND DISK DRIVE APPARATUS

CROSS REFERENCE TO RELATED APPLICATIONS

This application claims the benefit of priority to Japanese Patent Application No. 2017-173272 filed on Sep. 8, 2017 and Japanese Patent Application No. 2018-097627 filed on May 22, 2018. The entire contents of these applications are hereby incorporated herein by reference.

BACKGROUND OF THE INVENTION

1. Field of the Invention

The present invention relates to a base unit, a spindle motor, and a disk drive apparatus.

2. Description of the Related Art

A known base unit for use in a disk drive apparatus is described in JP-A 2013-223312. This base unit includes a base member arranged to support a motor, and a connector electrically connected to the motor. The base member includes a bottom plate portion arranged to extend perpendicularly to a central axis of the motor, a window portion arranged to pass through the bottom plate portion in an axial direction, and a first groove defined around the window portion in an upper surface of the bottom plate portion.

The connector includes a board portion arranged on the upper surface of the bottom plate portion to cover the window portion and the first groove, and an electrode terminal arranged on a lower surface of the board portion. The electrode terminal and the window portion are arranged to overlap with each other when viewed in the axial direction, and an adhesive is arranged between the upper surface of the bottom plate portion and the lower surface of the board portion. The adhesive is arranged to form a continuous closed loop around the window portion, and a portion of the adhesive is held in at least a portion of the first groove. Thus, a portion of the adhesive in a pre-hardened state is retained in the first groove when the connector is adhered to the base member.

However, in the case of the above-described known base unit, at the time of applying the adhesive, the adhesive in a liquid state (i.e., the adhesive in the pre-hardened state) within the first groove may flow out of the first groove, spread to an opposite side of the first groove with respect to the window portion over the base member, and further flow outwardly of the connector. If this happens, the adhesive between the connector and the base member may decrease so much as to cause a reduction in adhesive strength between the base member and the connector, resulting in a reduced reliability of the base unit.

SUMMARY OF THE INVENTION

A base unit according to a preferred embodiment of the present invention is a base unit for use in a disk drive apparatus including a motor arranged to be capable of rotating about a central axis extending in a vertical direction. The base unit includes a base member arranged to extend radially to support the motor, and including a predetermined adhesion region and an outside region outside of the adhesion region; and a connector electrically connected to a wire arranged on the base member. The connector is adhered to the base member through an adhesive at the adhesion region of the base member. A wettability of the adhesive on the adhesion region is higher than a wettability of the adhesive on the outside region of the base member.

A spindle motor according to a preferred embodiment of the present invention includes the base unit having the above-described structure, a bearing mechanism arranged on the base unit, and a rotating portion supported through the bearing mechanism to be rotatable about the central axis.

A disk drive apparatus according to a preferred embodiment of the present invention includes the spindle motor having the above-described structure; an access portion arranged to perform at least one of reading and writing of information from or to a disk supported by the rotating portion; and a cover member arranged to cover the base member to define a casing together with the base member. The rotating portion and the access portion are housed in the casing defined by the base member and the cover member. The casing has a gas having a density lower than that of air sealed therein.

The base unit, the spindle motor, and the disk drive apparatus according to the above preferred embodiments of the present invention are able to achieve an improvement in reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the accompanying drawings. It is assumed herein that a direction parallel to a central axis of a spindle motor is referred to by the term "axial direction", "axial", or "axially", that directions perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that an axial direction is a vertical direction, and that a side on which a cover member is arranged with respect to a base member is an upper side, and the shape of each member or portion and relative positions of different members or portions will be described based on the above assumptions. It should be noted, however, that the above definitions of the vertical direction and the upper and lower sides are not meant to restrict in any way the orientation of a base unit, a spindle motor, or a disk drive apparatus according to any preferred embodiment of the present invention when in use.

It is also assumed that the term "parallel" as used herein includes both "parallel" and "substantially parallel". It is also assumed that the term "perpendicular" as used herein includes both "perpendicular" and "substantially perpendicular".

Figure 1:
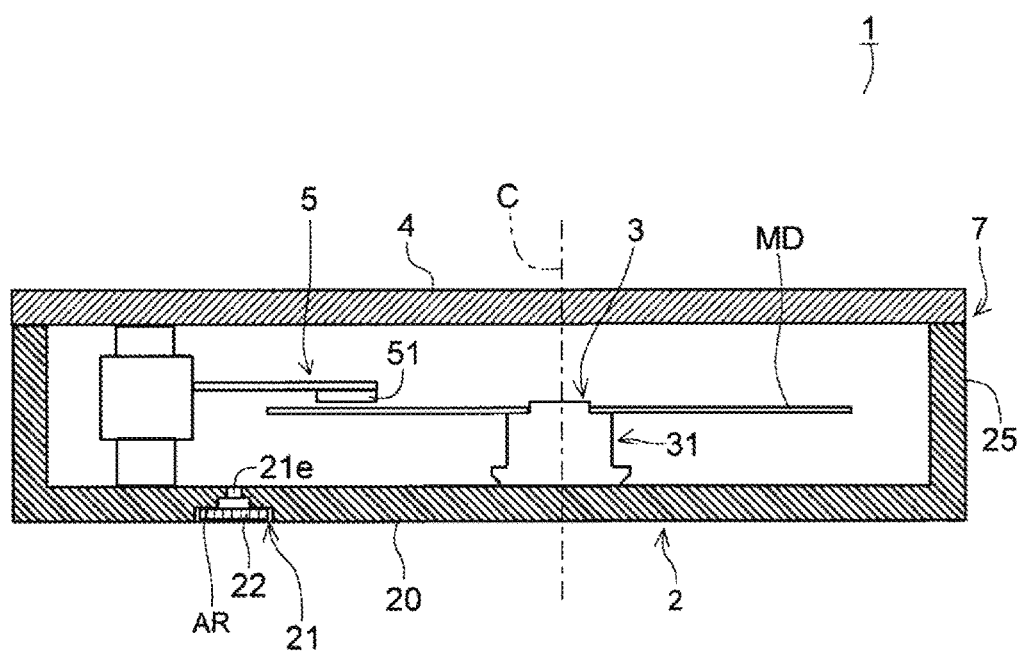
FIG. 1 is a vertical sectional view of a disk drive apparatus including a base unit according to a preferred embodiment of the present invention.
Figure 2:
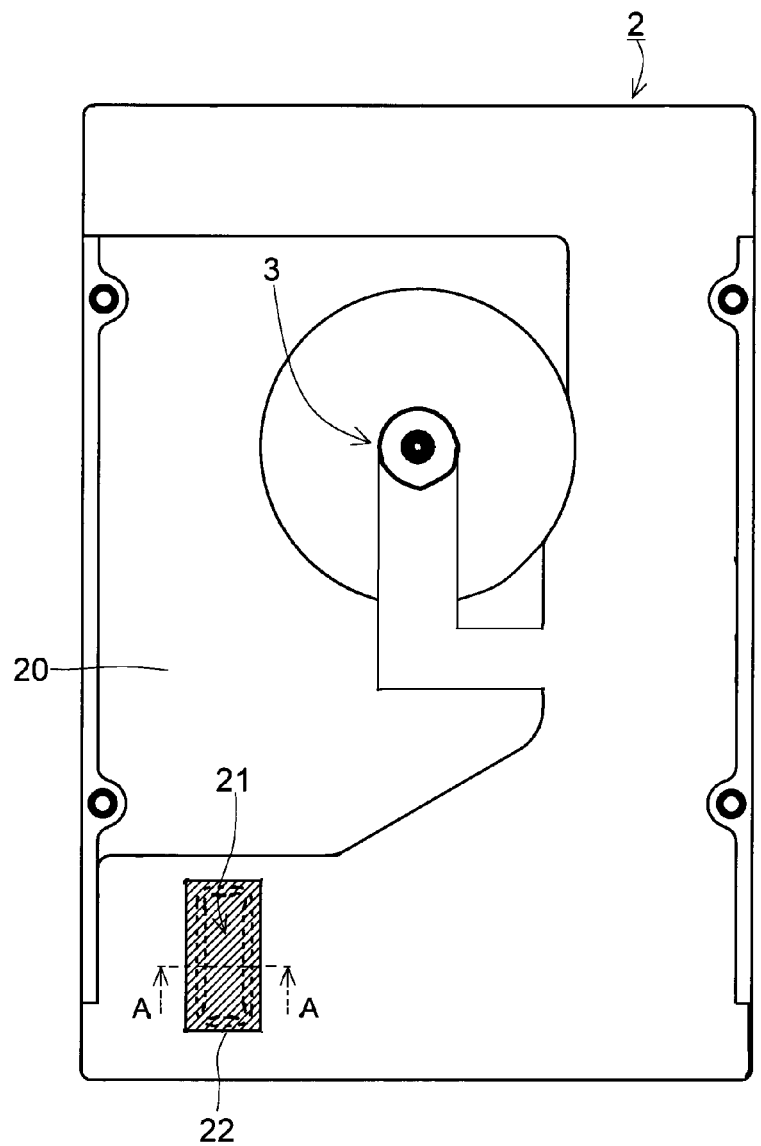
FIG. 2 is a plan view of the disk drive apparatus including the base unit according to a preferred embodiment of the present invention as viewed from below.

FIG. 1 is a vertical sectional view of a disk drive apparatus 1 including a base unit 2 according to a preferred embodiment of the present invention. FIG. 2 is a plan view of the disk drive apparatus 1 as viewed from below. The disk drive apparatus 1 is, for example, a so-called hard disk drive (HDD) apparatus, and includes a casing 7 arranged to house a spindle motor 3 and an access portion 5.

The spindle motor 3 is arranged to be capable of rotating about a central axis C extending in the vertical direction. The access portion 5 includes a head 51, and the head 51 is arranged to move along a recording surface of a magnetic disk MD (i.e., a disk) supported by a rotating portion 31 of the spindle motor 3. The access portion 5 is thus arranged to perform at least one of reading and writing of information from or to the magnetic disk MD.

The casing 7 includes the base unit 2 and a cover member 4, and a gas having a density lower than that of air is sealed in the casing 7. For example, helium, hydrogen, a gas mixture of helium and hydrogen, or the like may be used as the gas sealed in the casing 7. Note that air may alternatively be sealed in the casing 7.

The base unit 2 includes a base member 20 and a connector 22. The base member 20 is arranged to extend radially to support the spindle motor 3. The base member 20 is defined by a plate-shaped member being substantially rectangular when viewed in the axial direction, and is provided with a lateral wall portion 25 arranged to extend axially upward at a peripheral portion of the base member 20. An upper end surface of the lateral wall portion 25 includes a plurality of screw holes (not shown).

The cover member 4 is defined by a plate-shaped member being substantially rectangular when viewed in the axial direction, and is arranged to cover the base unit 2. A peripheral portion of the cover member 4 includes a plurality of through holes (not shown) each of which is arranged to pass therethrough in the axial direction. Screws (not shown) are inserted through the through holes, and are screwed into the screw holes in the lateral wall portion 25, whereby the cover member 4 is fitted to the lateral wall portion 25.

The base member 20 and the lateral wall portion 25 are defined by a single monolithic member, and the base member 20 and the lateral wall portion 25 are made of, for example, aluminum or stainless steel. Note that the base member 20 and the lateral wall portion 25 may alternatively be defined by separate members, and may alternatively be made of different materials.

The connector 22 is housed in a connector housing portion 21, which is defined by a recessed portion defined in a lower surface (i.e., an outer surface) of the base member 20. The connector housing portion 21 will be described in detail below.

Figure 3:
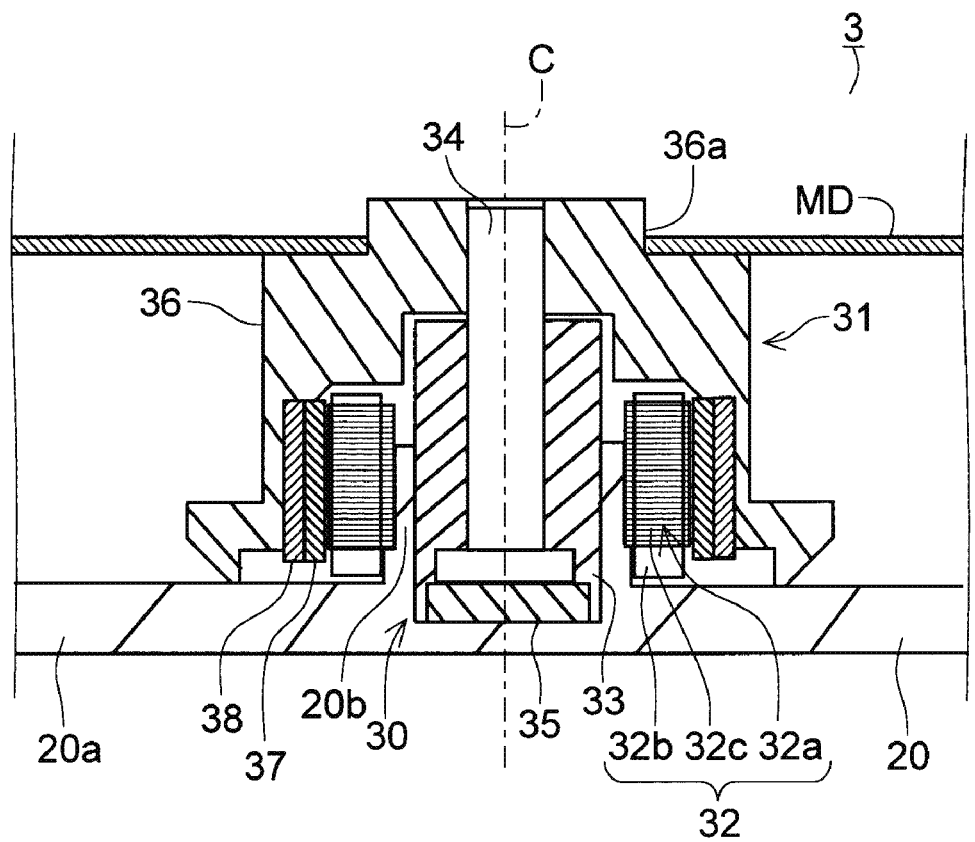
FIG. 3 is a vertical sectional view of a spindle motor of the disk drive apparatus according to a preferred embodiment of the present invention.

FIG. 3 is a vertical sectional view illustrating the spindle motor 3. The spindle motor 3 includes a stationary portion and the rotating portion 31. The stationary portion 30 is arranged to be stationary relative to the cover member 4. The rotating portion 31 is supported to be rotatable with respect to the stationary portion 30.

The stationary portion 30 includes the base member 20, a stator 32, a sleeve 33, and a cap 35.

The base member 20 is arranged to support the stator 32 and the sleeve 33. The base member 20 includes a bottom plate portion 20a and a cylindrical portion 20b, which has a bottom and is substantially cylindrical. The bottom plate portion 20a is arranged to extend perpendicularly to the central axis C below the rotating portion 31, the magnetic disk MD, and the access portion 5. The lateral wall portion 25 is arranged at a peripheral portion of the bottom plate portion 20a. The cylindrical portion 20b is arranged to be substantially coaxial with the central axis C, about which the spindle motor 3 is arranged to rotate, on the bottom plate portion 20a.

The stator 32 includes a stator core 32a and a plurality of coils 32b. The stator core 32a is, for example, defined by laminated steel sheets, that is, electromagnetic steel sheets, such as silicon steel sheets, placed one upon another in the axial direction. The stator core 32a is fixed to an outer circumferential surface of the cylindrical portion 20b. In addition, the stator core 32a includes a plurality of teeth 32c arranged to project radially outward. Each coil 32b is defined by a conducting wire wound around a separate one of the teeth 32c.

The sleeve 33 is arranged to extend in the axial direction to substantially assume a cylindrical shape around a shaft 34, which will be described below. A lower portion of the sleeve 33 is housed in the cylindrical portion 20b, and is fixed to the cylindrical portion 20b through, for example, an adhesive. An inner circumferential surface of the sleeve 33 is arranged radially opposite to an outer circumferential surface of the shaft 34. In addition, a lower opening of the sleeve 33 is closed by the cap 35.

The rotating portion 31 includes the shaft 34, a hub 36, and an annular magnet 37.

The shaft 34 is arranged to extend in the axial direction on a radially inner side of the sleeve 33. An upper end portion of the shaft 34 is arranged to project upward above an upper surface of the sleeve 33. In addition, a lubricating fluid (not shown) is arranged between the shaft 34 and a combination of the sleeve 33 and the cap 35. The shaft 34 is supported through the lubricating fluid to be rotatable with respect to the sleeve 33 and the cap 35. A polyolester oil, a diester oil, or the like, for example, can be used as the lubricating fluid.

The sleeve 33, the cap 35, and the lubricating fluid together define a bearing mechanism. The rotating portion 31 is supported to be rotatable about the central axis C through the bearing mechanism arranged on the base unit 2.

The hub 36 is arranged to extend radially outward and axially downward from a peripheral portion of the upper end portion of the shaft 34. An inner circumferential portion of the hub 36 is fixed to the upper end portion of the shaft 34. In addition, an annular shoulder portion 36a is arranged at an upper end portion of the hub 36, and the magnetic disk MD is supported by the shoulder portion 36a.

The magnet 37 is fixed to the hub 36 with a back yoke 38 made of a magnetic material therebetween. A radially inner surface of the magnet 37 is arranged radially opposite to each of the teeth 32c. In addition, the radially inner surface of the magnet 37 includes north and south poles arranged to alternate with each other in a circumferential direction.

In the spindle motor 3 having the above-described structure, once electric drive currents are supplied to the coils 32b, radial magnetic flux is generated around each of the teeth 32c of the stator core 32a. Then, interaction between the magnetic flux of the teeth 32c and magnetic flux of the magnet 37 produces a circumferential torque, so that the rotating portion 31 is caused to rotate about the central axis C with respect to the stationary portion 30. The magnetic disk MD supported by the shoulder portion 36a of the hub 36 is caused to rotate about the central axis C together with the rotating portion 31.

Figure 4:
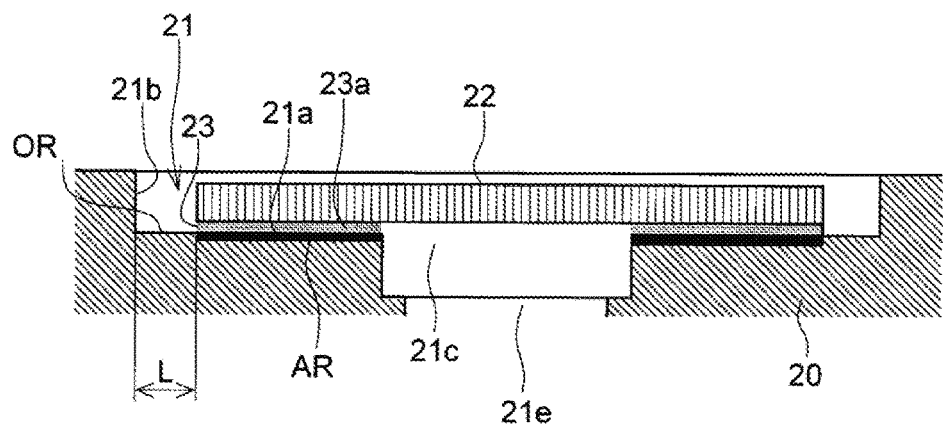
FIG. 4 is a sectional view of a portion of the disk drive apparatus taken along line A-A in FIG. 2.

FIG. 4 is a sectional view of a portion of the disk drive apparatus 1 taken along line A-A in FIG. 2. Upper and lower sides in FIG. 4 correspond to lower and upper sides, respectively, in FIG. 1. The base member 20 includes the connector housing portion 21, which is recessed axially upward from the lower surface of the base member 20, and is arranged to house the connector 22. A wire accommodating portion 21c, which is defined by a recessed portion recessed axially upward, is defined at a central portion of a bottom surface 21a of the connector housing portion 21. An insert hole 21e, which is arranged to pass through the base member 20 in the axial direction, is defined at a bottom surface of the wire accommodating portion 21c. A portion of a wire (not shown) electrically connected to an upper surface (i.e., a surface on the lower side in FIG. 4) of the connector 22 is accommodated in the wire accommodating portion 21c. The wire is drawn out onto an upper surface of the base member 20 through the insert hole 21e to be arranged on the base member 20, and is electrically connected to, for example, the access portion 5. In addition, a board (not shown) is electrically connected to a lower surface (i.e., a surface on the upper side in FIG. 4) of the connector 22. The board is electrically connected to an external power supply unit (not shown). On the bottom surface 21a of the connector housing portion 21, an adhesion region AR is arranged outside of the wire accommodating portion 21c.

The adhesion region AR is defined by performing laser ablation on the bottom surface 21a. A carbon dioxide laser beam or an $YVO_4$ laser beam, for example, may be used in the laser ablation. That is, a surface of the base member 20 which includes the adhesion region AR is in a state of having been irradiated with a laser beam. The connector 22 is adhered to the base member 20 through an adhesive 23 at the adhesion region AR of the base member 20. As a result of the laser ablation, surface free energy of the adhesion region AR is higher than surface free energy of an outside region OR, which is a region of the base member 20 outside of the adhesion region AR. Thus, a wettability of the adhesive 23 on the adhesion region AR is higher than a wettability of the adhesive 23 on the outside region OR. In the present preferred embodiment, the adhesion region AR is a region in the bottom surface 21a which is covered by the connector 22 when viewed in the axial direction and which excludes the bottom surface of the wire accommodating portion 21c, and is in the shape of a loop when viewed in the axial direction.

Since the surface of the base member 20 which includes the adhesion region AR is in the state of having been irradiated with a laser beam, an improvement in the wettability of the adhesive 23 on the adhesion region AR can be easily achieved.

In addition, the base member 20 is made of aluminum or stainless steel. Therefore, the laser beam is easily absorbed by the base member 20 to allow the laser ablation to be smoothly accomplished. Thus, improved workability at the time of the laser ablation is achieved.

As described above, the base unit 2 is for use in the disk drive apparatus 1 including the spindle motor 3 (i.e., a motor) arranged to be capable of rotating about the central axis C extending in the vertical direction. The base unit 2 includes the base member 20, which is arranged to extend radially to support the spindle motor 3, and the connector 22, which is electrically connected to the wire (not shown) arranged on the base member 20. The connector 22 is adhered to the base member 20 through the adhesive 23 at the predetermined adhesion region AR of the base member 20. The wettability of the adhesive 23 on the adhesion region AR is higher than the wettability of the adhesive 23 on the outside region OR of the base member 20.

The adhesive 23 is a two-part adhesive including a base agent and a curing agent. When the two-part adhesive is used as the adhesive 23, the adhesive 23 can be easily hardened even at room temperature. Examples of the base agent include an epoxy resin and an acrylic resin, while examples of the curing agent include a polyamide resin. The adhesive 23 according to the present preferred embodiment contains a polycondensate (in a liquid state) of 4,4"-isopropylidene-diphenol and 1-chloro-2,3-epoxypropane as the base agent, a formaldehyde-1-chloro-2,3-epoxypropane-phenol polycondensate as the curing agent, a titanium(IV) oxide as a thickening agent, 2,2"-(methylenebis (phenyleneoxymethylene)) bisoxirane, and carbon black. Note that the adhesive 23 may alternatively be a one-part thermosetting adhesive.

Referring to FIG. 4, an appropriate amount of the adhesive 23 in a liquid state is applied onto the adhesion region AR with the lower surface of the base member 20 facing upward, and then, the connector 22 is arranged on the adhesive 23 in the liquid state. As a result, the adhesive 23 in the liquid state smoothly spreads over the adhesion region AR, which has a high wettability. In addition, the outside region OR, which lies outside of the adhesion region AR on the base member 20, has a wettability lower than that of the adhesion region AR, and this prevents the adhesive 23 in the liquid state from flowing onto the outside region OR. This leads to increased adhesive strength between the connector 22 and the base member 20, and an improved reliability of the base unit 2.

In addition, the adhesive 23 in the liquid state easily spreads over the entire adhesion region AR to fill a gap between the connector 22 and the base member 20. Thus, an adhesive layer 23a is formed between the connector 22 and the base member 20. The formation of the adhesive layer 23a results in improved adhesion between the adhesive 23 and the adhesion region AR and between the adhesive 23 and the connector 22, which contributes to preventing the gas sealed in the casing 7 from leaking out Here, since the wettability of the adhesive 23 on the adhesion region AR is high, different viscosities or permeabilities of the base agent and the curing agent of the adhesive 23 will not easily cause a separation between the base agent and the curing agent. This contributes to preventing a portion of the adhesive 23 from remaining uncured, even when the two-part adhesive is used as the adhesive 23, and leads to an improved reliability of the base unit 2.

In addition, if the distance L between a side wall 21b of the connector housing portion 21 and the adhesion region AR measured in a direction perpendicular to the axial direction is smaller than 0.1 mm, the adhesive 23 in the liquid state on the adhesion region AR may easily come into contact with the side wall 21b. A contact of the adhesive 23 in the liquid state with the side wall 21b will permit the adhesive 23 in the liquid state to easily move out of the adhesion region AR toward the side wall 21b. At this time, in the two-part adhesive 23, one of the base agent and the curing agent, which have different viscosities or permeabilities, will move toward the side wall 21b. This will promote a separation between the base agent and the curing agent, allowing a portion of the adhesive 23 to remain uncured. Meanwhile, if the distance L is greater than 2.0 mm, a space of the connector housing portion 21 will be large, allowing an increased size of the base unit 2. Accordingly, it is desirable that the distance L is in the range of 0.1 mm to 2.0 mm inclusive.

Specifically, when the distance L is 0.1 mm or more, a contact of the adhesive 23 in the liquid state on the adhesion region AR with the side wall 21b can be prevented to more effectively prevent the adhesive 23 from flowing out of the adhesion region AR while the connector 22 is housed in the connector housing portion 21. In addition, when the distance L is 2.0 mm or less, a reduced size of the base unit 2 can be achieved without the space of the connector housing portion 21 being larger than necessary.

In addition, it is desirable that the adhesion region AR is arranged to have a degree of surface roughness of Ra 0.5 µm or more, because this will allow the adhesive 23 to more easily stay on the adhesion region AR, and contribute to more effectively preventing the adhesive 23 in the liquid state from flowing out onto the outside region OR.

Figure 5:
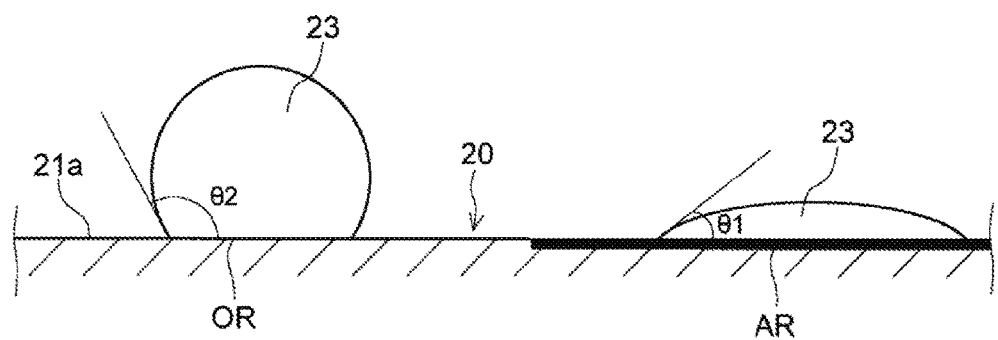
FIG. 5 is a side sectional view for explaining contact angles of an adhesion region and an outside region with an adhesive in the base unit according to a preferred embodiment of the present invention.

FIG. 5 is a side sectional view for explaining contact angles of the adhesion region AR and the outside region OR with the adhesive 23. On the base member 20, the wettability of the adhesive 23 on the adhesion region AR is higher than the wettability of the adhesive 23 on the outside region OR. Accordingly, a contact angle 61 of the adhesion region AR with the adhesive 23 is smaller than a contact angle 62 of the outside region OR with the adhesive 23. Here, it is desirable that a difference between the contact angles 61 and 62 is 20 degrees or more, because this will contribute to more effectively preventing the adhesive 23 in the liquid state from flowing out of the adhesion region AR onto the outside region OR.

In the disk drive apparatus 1 having the above-described structure, the magnetic disk MD is supported by the rotating portion 31 of the spindle motor 3, and the rotating portion 31 rotates about the central axis C. The head 51 of the access portion 5 moves along the recording surface of the magnetic disk MD, and the access portion 5 performs at least one of the reading and the writing of information from or to the magnetic disk MD.

At this time, the gas having a density lower than that of air is sealed in the casing 7. Accordingly, a reduction in viscous drag applied to each of the magnetic disk MD and the access portion 5 is achieved. This leads to a reduction in a windage loss of each of the magnetic disk MD and the access portion 5 while the disk drive apparatus 1 is in operation.

Including the base unit 2, each of the spindle motor 3 and the disk drive apparatus 1 is able to achieve an improved reliability.

Figure 6:
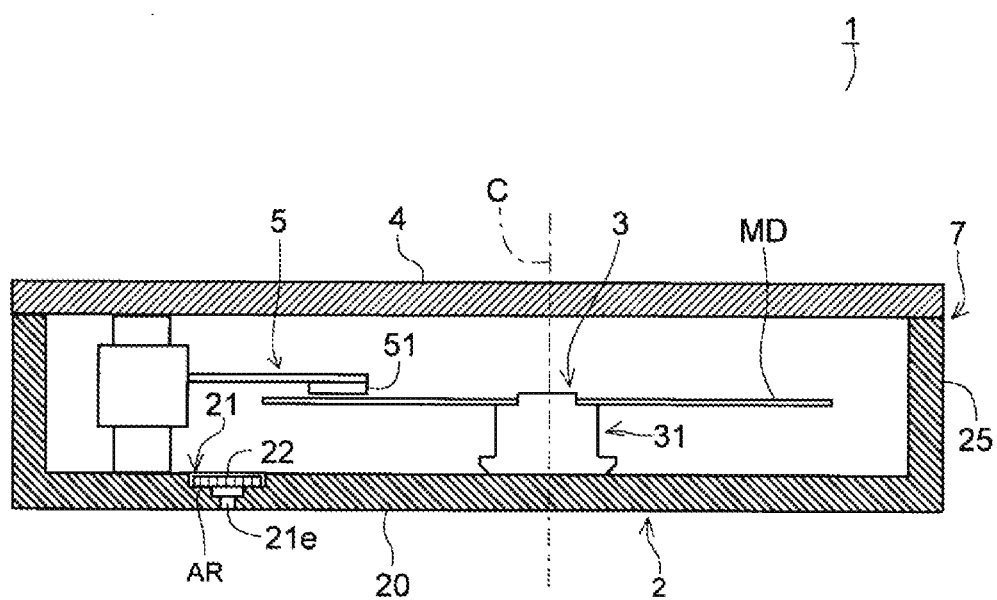
FIG. 6 is a vertical sectional view of a disk drive apparatus including a base unit according to a modification of the above preferred embodiment of the present invention.

Referring to FIG. 6, a connector housing portion 21 may be defined in an upper surface (i.e., an inner surface) of a base member 20 in a modification of the present preferred embodiment. In other words, the base member 20 may include the connector housing portion 21 recessed in the axial direction from the upper surface thereof, and arranged to house a connector 22. In this case, a wire is electrically connected to an upper surface of the connector 22. In addition, an insert hole 21e, which is arranged to pass through the base member 20 in the axial direction, is defined at a bottom surface 21a of the connector housing portion 21, and a lead wire (not shown) is drawn out from the connector 22 through the insert hole 21e, and is electrically connected to a board (not shown). At this time, an adhesive 23 prevents a gas inside of a casing 7 from leaking out, but a seal member (not shown) may be further provided in the insert hole 21e to prevent a leakage of the gas inside of the casing 7.

Note that, although the adhesion region AR is defined by the laser ablation in the present preferred embodiment, the adhesion region AR may alternatively be defined by a process other than the laser ablation. Specifically, the adhesion region AR may alternatively be defined by, for example, applying a coating film onto the surface of the base member 20 instead of by performing the laser ablation. The coating film may be made of any desired material, and may be made of, for example, a fluorosurfactant.

Also note that, in a modification of the present preferred embodiment, the connector housing portion 21 may be omitted, with the connector 22 being adhered to the upper surface (i.e., the inner surface) or the lower surface (i.e., the outer surface) of the base member 20 through the adhesive 23.

Preferred embodiments of the present invention are applicable to, for example, base units for use in disk drive apparatuses. Preferred embodiments of the present invention are also applicable to, for example, spindle motors and disk drive apparatuses including base units.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base unit for use in a disk drive apparatus including a motor arranged to be capable of rotating about a central axis extending in a vertical direction, the base unit comprising:
    a base member arranged to extend radially to support the motor, and including a predetermined adhesion region and an outside region outside of the adhesion region; and
    a connector electrically connected to a wire arranged on the base member; wherein
    the connector is adhered to the base member through an adhesive at the adhesion region of the base member;
    a wettability of the adhesive on the adhesion region is higher than a wettability of the adhesive on the outside region of the base member; and
    the base member includes a connector housing portion recessed in an axial direction and arranged to house the connector;
    the adhesion region is arranged in a bottom surface of the connector housing portion; and
    a distance between a side wall of the connector housing portion and the adhesion region measured in a direction perpendicular to the axial direction is in a range of 0.1 mm to 2.0 mm inclusive.

2. The base unit according to claim 1, wherein a difference between a contact angle of the adhesion region with the adhesive and a contact angle of the outside region with the adhesive is 20 degrees or more.

3. The base unit according to claim 1, wherein the adhesion region is arranged to have a degree of surface roughness of Ra 0.5 µm or more.

4. The base unit according to claim 1, wherein a surface of the base member which includes the adhesion region is in a state of having been irradiated with a laser beam.

5. The base unit according to claim 1, wherein the base member is made of aluminum or stainless steel.

6. The base unit according to claim 1, wherein the adhesive is a two-part adhesive including a base agent and a curing agent.

7. A spindle motor comprising:
the base unit of claim 1;
a bearing mechanism arranged on the base unit; and
a rotating portion supported through the bearing mechanism to be rotatable about the central axis.

8. A disk drive apparatus comprising:
the spindle motor of claim 7;
an access portion arranged to perform at least one of reading and writing of information from or to a disk supported by the rotating portion; and
a cover member arranged to cover the base member to define a casing together with the base member; wherein
the rotating portion and the access portion are housed in the casing defined by the base member and the cover member; and
the casing has a gas having a density lower than that of air sealed therein.

* * * * *